D. P. FORNEY.
Steam-Plow.

No 18,442.

Patented Oct. 20, 1857.

UNITED STATES PATENT OFFICE.

D. P. FORNEY, OF JACKSONVILLE, ALABAMA.

IMPROVEMENT IN COTTON-CULTIVATORS.

Specification forming part of Letters Patent No. 18,442, dated October 20, 1857.

*To all whom it may concern:*

Be it known that I, DANIEL P. FORNEY, of Jacksonville, in the county of Benton and State of Alabama, have invented a new and useful Machine for Chopping and Thinning Cotton; and for the purpose of enabling others to use my invention, I do hereby declare the following to be a full, clear, and exact description of the same in the construction and operation of all the material parts, reference being had to the annexed drawings, making a part of this specification, in which—

Figure 1:
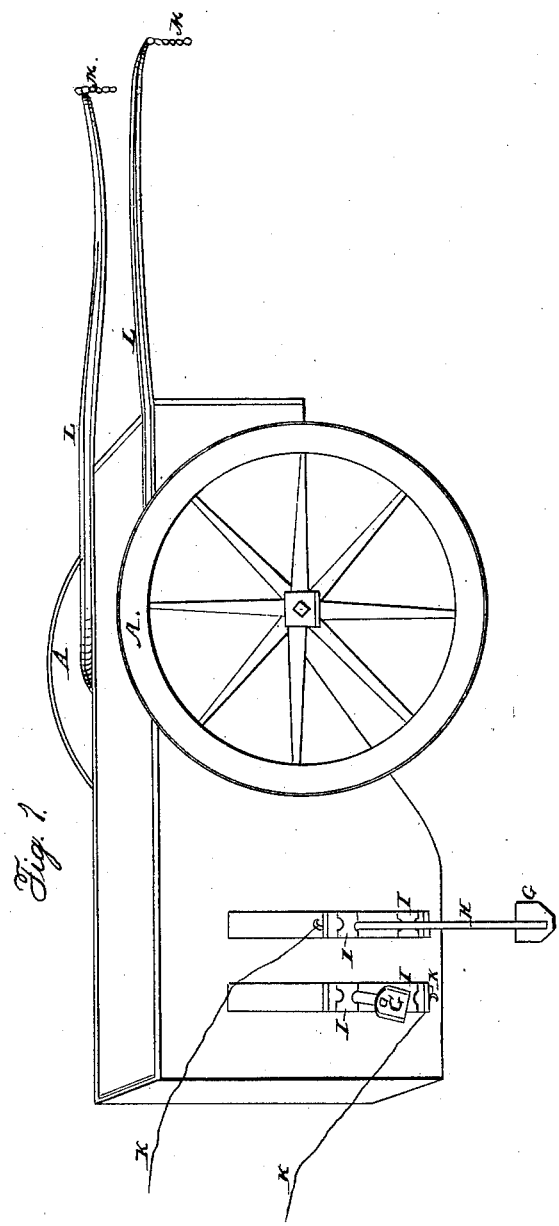
Figure 2:
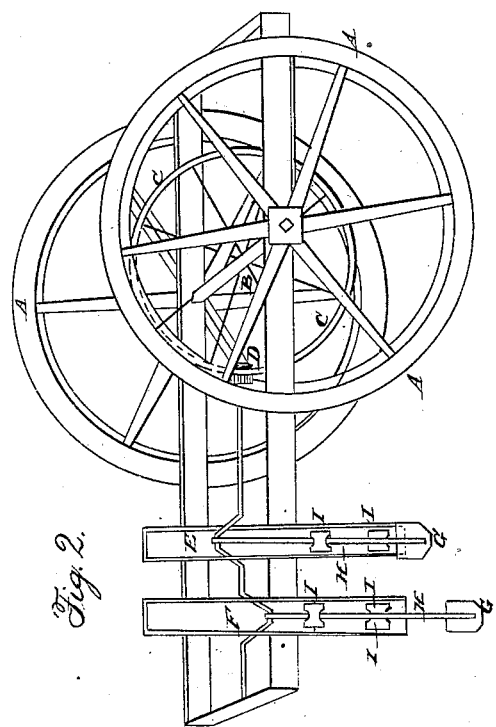

Figure 1 is a perspective view, and Fig. 2 is a skeleton view, showing the machinery. The reference-letters will equally apply to both views, Figs. 1 and 2.

A and A are two common cart-wheels $40\frac{107}{1000}$ (forty and one hundred and seven thousandths) of an inch in diameter, firmly attached to an axle, B, which revolves with the wheels A and A. The revolution of the wheels A and A upon the ground cause the whole machine to advance.

The axle B, made of iron or any substantial wood, is three feet long from outside to outside of the wheels A and A. If of iron, two inches square. Upon the axle B a cogged or beveled wheel, C, is attached, revolving with the wheels A and A. The wheel C is twenty-four inches in diameter with forty-eight (48) cogs or leaves. This wheel C may be less in diameter, say twenty (20) inches, and then the periphery would be farther from the ground. A pinion, D, with eight cogs or leaves running in the wheel C, and at right angles to the wheels C and A A, works two cranks, E and F, on opposite sides of the shaft of the pinion D, made of iron an inch and a half in diameter and three feet and a half long. The opposite end of the shaft from the pinion D works or runs in a bearing let into a cross bar of the cart.

To each of the cranks E and F is attached a hoe, G, eight inches broad, with iron handle an inch in diameter and three feet long, H. The first crank, E, on shaft of the pinion D is sixteen inches from the pinion D, or any distance so as to merely strike clear of the wheel A. The second crank, F, is twenty-one inches from the crank E—that is, from center to center of the cranks E and F. If the cranks E and F were upon the same side of the shaft, they should only be eleven inches apart if the hoes G were eight inches and the space to be left was three inches. The calculation for this machine is to cut out eight inches of the row and to leave two and a half inches of cotton standing. Let each hoe be eight inches broad and the space left between the cuts be two and a half inches, and they will cut out twenty-one (21) inches of the row of cotton; and as the wheel C has forty-eight cogs and the pinion D eight cogs, the pinion D, with the cranks E and F, to which the hoes G are attached, would revolve six times to the wheel C once; and as the wheel C revolves with the wheels A and A, one revolution of the wheels A and A would be one hundred and twenty-six inches, just six times the cut of the two hoes G, including the space left between the cuts.

This machine is intended to be run parallel with the rows of cotton. If it is desired not to cut out as much as eight inches, lessen the width of the hoe G; if more than eight inches, increase the width of the hoe G. Any desired width of cut and space left can be obtained by a simple calculation. Only one hoe might be used by increasing the speed of the pinion D. Do this by increasing the number of cogs in the wheel C, or more than two hoes might be used by lessening the speed of the pinion D, and with it the cranks E and F.

To cause the hoe G to strike the ground with greater force than the natural weight of the hoe—that is, to cause the hoe G to make a lick similar to that made by the hand—two rollers, I, in a sliding frame that can be elevated or depressed at pleasure, are placed in the side of the cart, the one below the other above the handle H of the hoe G; the one above it to prevent the hoe from bouncing and to hold it steady, the one below to prevent friction and to give ease of motion to the handle H, and also to prevent the hoe G from going too deep in the ground. To give an up-and-down stroke to the hoe G the lower of the two rollers I is placed in a line with the shaft of the cranks E and F and the point on the ground where the hoes G strike. Thus as the cranks E and F ascend the hoe G descends, and as the cranks E and F descend the hoe G ascends, thus giving an up-and-down motion to the hoe G. When the cranks E and F reach that point in their ascent where they would be on a line with their shaft, and the point where the hoe G cuts the ground, the hoe G would be on the ground, and as the cranks move on until they strike the same line on the opposite side of the shaft; the hoe G would remain on the ground and be pulled across the row, thereby cutting out the cotton. Then, as the cranks E and F begin to descend below the line, the hoe G will ascend, clear itself of earth and be raised above the row of cotton, ready to make another lick, and so on to the end of the row.

To cause the hoes G to avoid stumps, stones, &c., and also to prevent the hoe G from cutting out the cotton when, in common parlance, "the stand is bad," (it is frequently the case that all the cotton should be left, and even then the stand is not sufficient for a full crop,) a brake, K, is attached, so as to elevate the rollers I—that is, the whole frame which contains the rollers, and with the rollers I the hoe G. The brake is so arranged that by pressing on the handle the frame containing the roller I will be elevated. Take off the pressure and the frame, with the rollers I, will fall or slide down by their own weight.

The brake can be attached in various ways. The most simple is that seen in the model now on file in the office, which is nothing more than a small bar of wood or iron in the form of a lever having a spike driven into the cart back of the rollers I, which operates as a fulcrum to the lever. The end of the lever or brake K next to the rollers I works in a ring or hook in the frame which contains the rollers I. The back or hind end of the lever is made in the form of a plow-handle when two hoes are used. The brake to the front rollers should be attached to the upper part of the sliding frame which contains the rollers, so as not to interfere with the elevating of the back or hindermost hoe, and the brake to the rear or hinder hoe or roller should be attached to the bottom of the frame.

This machine is intended to be drawn by a horse or mule attached by a shaft, as seen at L, a few links of chain, M, to fasten in the loggerhead of the hames, and no gearing except a collar and hames are necessary.

In order to prevent the hoe G from cutting in passing from one field to another—that is, when it is desired to move the machine when it is not wanted for chopping—a key should hold the wheel C fast to the shaft B, loosen the key of the wheel C, slide the wheel C back on the shaft B—that is, throw it out of gear from the pinion D—and the end desired is obtained with very little trouble.

I claim—

The application of the rollers I and brake K, in combination with the hoes G and cranks E and F, substantially in the manner and for the purpose before described.

DANIEL P. FORNEY.

Attest:
FRANK H. GOODWIN,
JOHN H. CRAWFORD.